Feb. 25, 1936.  E. A. AZZARA  2,031,811
SURF FISHING DEVICE
Filed Aug. 13, 1934  2 Sheets-Sheet 2
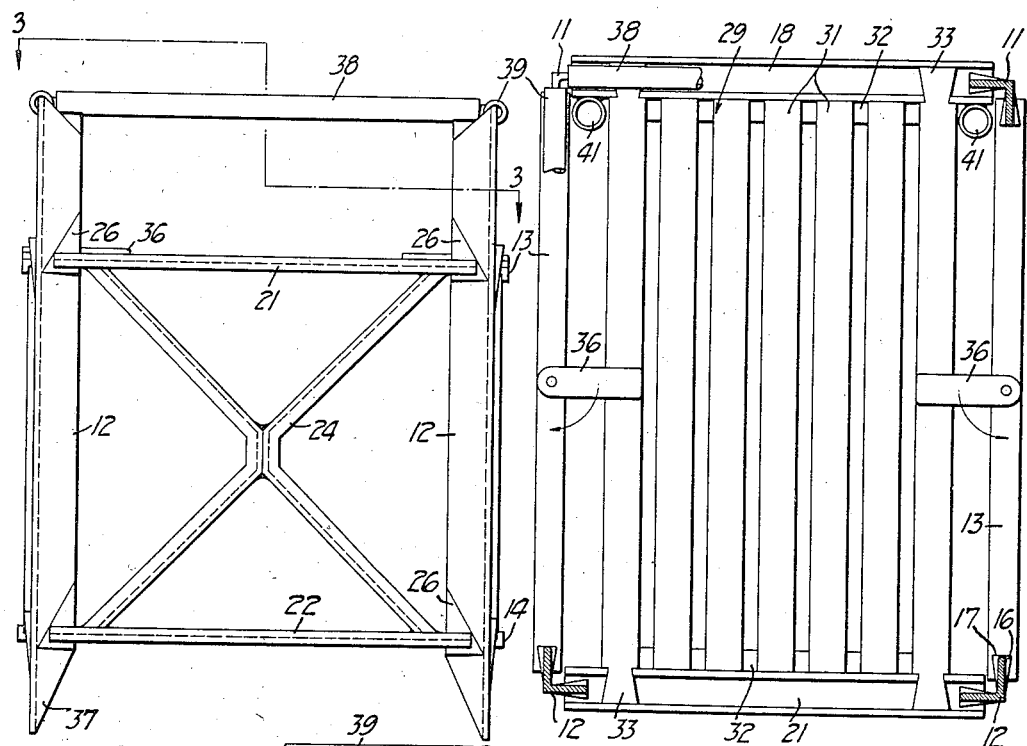
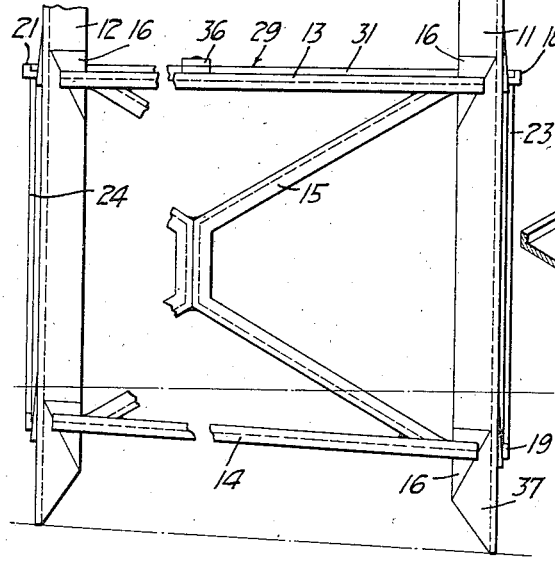
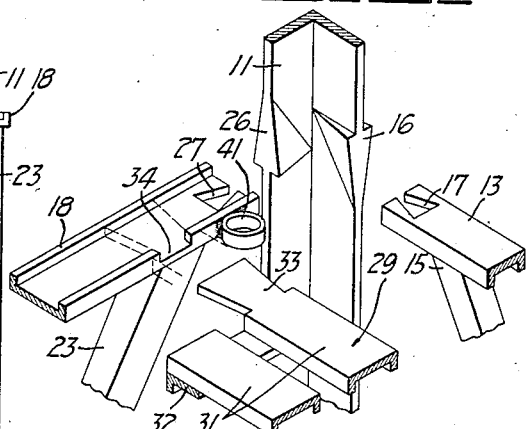
INVENTOR.
Eugenio A. Azzara
BY
ATTORNEY Patented Feb. 25, 1936

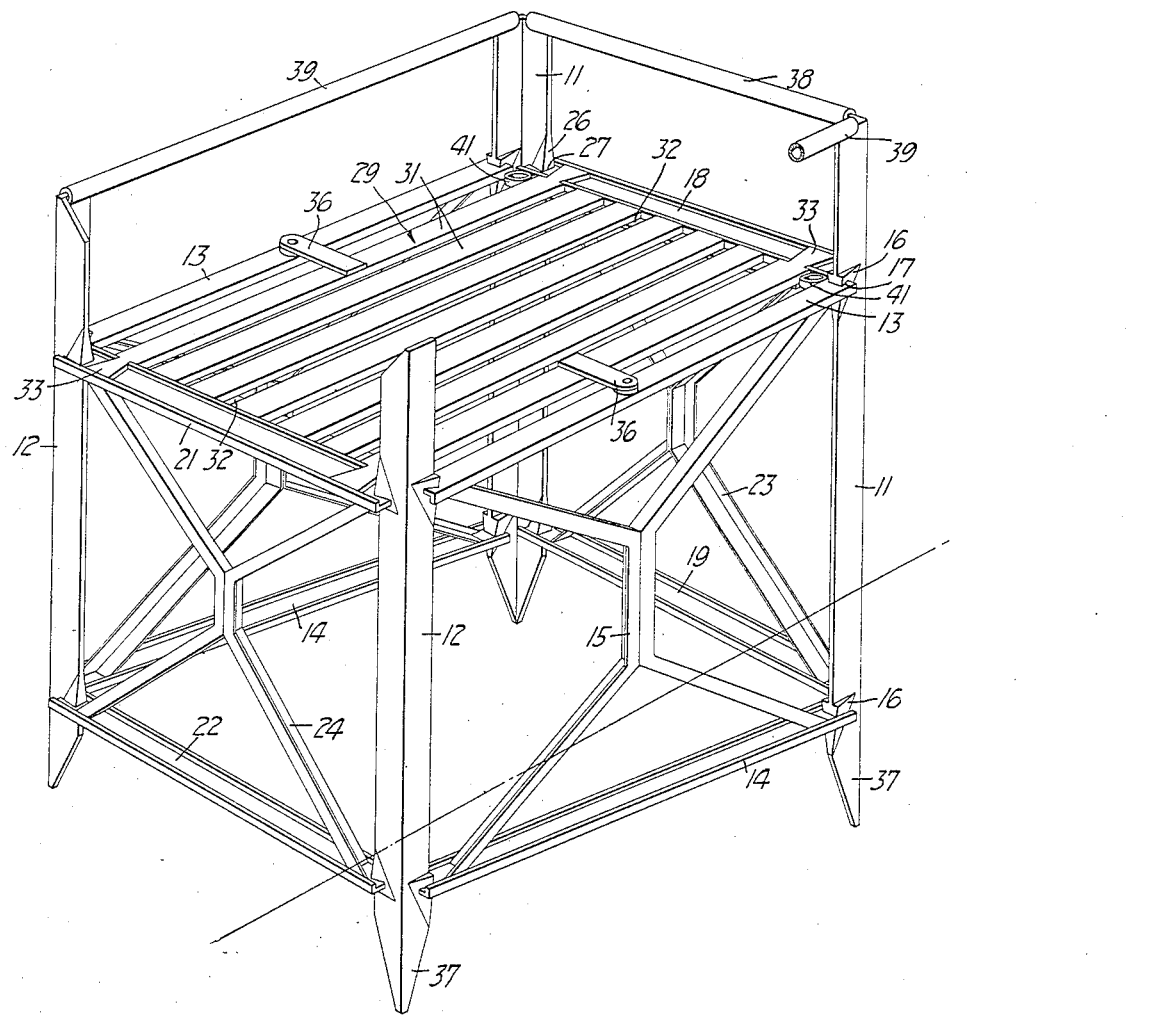

2,031,811

UNITED STATES PATENT OFFICE 2,031,811

SURF FISHING DEVICE

Eugenio A. Azzara, San Francisco, Calif.

Application August 13, 1934, Serial No. 739,606

3 Claims. (Cl. 304—2)

This invention relates generally to devices for use in surf fishing as practised with a casting rod and line.

In surf fishing with a rod and line, continual wading in the water during casting, and the necessity of retreating up the beach for baiting, are inconvenient and detract considerably from the pleasure of this sport. Likewise, it is frequently difficult to secure a good footing while wading in the surf, to ensure a good cast. In general, one can cast greater distances with greater convenience if a more secure footing is afforded at an elevated position. In most instances, however, such conveniences in the form of permanent structures are not available.

It is an object of the present invention to provide a device which will afford a light, portable platform from which position of advantage a fisherman may cast into the surf and rebait substantially the same as if operating from a permanent pier or like structure.

A further object of the invention is to provide a device of the above character which will be light in weight and which can be collapsed to enhance portability, but which at the same time will be sufficiently strong to serve the purposes intended.

Further objects of the invention will appear from the following description in which the preferred embodiment of the invention has been set forth in detail in conjunction with the accompanying drawings.

Referring to the drawings:

Fig. 1 is a perspective view, illustrating a device incorporating the present invention.

Fig. 2 is an end view of the device shown in Fig. 1.

Fig. 3 is a cross-sectional detail taken along the line 3—3 of Fig. 2.

Fig. 4 is a side-elevational view of the device shown in Fig. 1:

Fig. 5 is a perspective detail, illustrating certain interlocking connections employed in my device.

The device as illustrated in the drawings consists of a plurality of structural members which, when connected together, form an elevated platform. The material utilized is preferably a light, strong metal, such as aluminum or an aluminum alloy. In the construction illustrated, the structural members include front and rear corner members 11 and 12, which may be in the form of angles to afford sufficient rigidity with lightness. Interconnecting the front and rear members 11 and 12 along the sides of the device, are the upper and lower longitudinal members 13 and 14. Cross-bracing members 15 are likewise provided, which in this instance are permanently connected to the upper and lower members 13 and 14, although it is apparent that detachable interlocking connections can be provided if desired. The connections between the ends of members 13 and 14 and the upright members 11 and 12 are interlocking and detachable, and can be constructed as illustrated in detail in Fig. 5. Thus, one of the corner members 11 is shown provided with an enlarged, wedge-shaped portion 16, which is adapted to interlock with a dove-tailed slot 17 in the corresponding end of member 13. It will be noted that the interlock is established by upward movement of member 13 relative to the corner member 11, to substantially the position illustrated in Fig. 1. Similar wedge-shaped portions 16 are provided near the lower ends of the corner members 11 and 12, to interlock with the lower lateral member 14.

The front corner members 11 are likewise connected together by the upper and lower lateral members 18 and 19, and the corner members 12 by the upper and lower lateral members 21 and 22. Members 18 and 19 can be connected by cross-bracing 23, and members 21 and 22 by the bracing 24. Detachable interlock connections are also provided between the ends of the aforementioned lateral members and the corner members 11 and 12. Thus, as shown in Fig. 5, a corner post 11 is provided with an enlarged wedge-shaped portion 26, adapted to interlock with a dove-tailed slot 27 in the corresponding end of member 18. Note that such interlock connection is established by downward movement of the member 18 with respect to the corresponding corner member 11. By reference to Fig. 1, it will be clear that similar interlock connections are provided between member 21 and members 12, and between the lower lateral members 19 and 22 and the lower portions of members 11 and 12.

In order to form a floor for the device, upon which one may stand, I have provided a floor section 29 which can be formed of spaced longitudinal bars 31 connected by the cross slats 32. Certain of the bars 31 are shown provided with end extensions 33 which rest upon the upper lateral members 18 and 21 and which may interlock in slots 34.

As the device has been described above, it is formed of side, front, and rear sections which are detachably interlocked with respect to the corner members 11 and 12. The side sections are formed by the longitudinal members 13 and 14 in conjunction with bracing 15; the front section is formed by the lateral members 18 and 19 in conjunction with bracing 23; and the front section is formed by the lateral members 21 and 22 in conjunction with bracing 24. The side sections interlock with the corner members 11 and 12, by upward movement relative to the same, while the front and rear sections interlock by relative downward movement. To hold the various sections in properly interlocking and assembled relationship, I provide suitable means such as the tabs or latches 36 which are pivotally secured to the upper longitudinal members 13. When these latches are swung to the position illustrated in Fig. 1, they overlie the adjacent bars 31, thus retaining the side, front, and rear sections in assembled relationship with respect to the corner members 11 and 12, and likewise serving to retain the floor section 29 in proper position. When latches 36 are swung to positions parallel to the members 13, or outwardly, the side, front, and rear sections can be detached with respect to the corner members 11 and 12, and the floor section 29 can be removed.

In utilizing my device on the beach, some means must be provided to prevent it from being displaced by the waves. Thus, the lower end portion 37 of each of the corner members extends downwardly below the level of the lower longitudinal and lateral members 14, 19 and 22, and is pointed so that it can be forced down into the sand. In other words, each of the corner members forms in effect a stand spike to prevent displacement.

In many instances beaches have only a gradual slope, so that it is feasible to have the longitudinal members 13 and 14 of the side sections parallel, with the corner members 11 and 12 of equal length. However, the proportioning illustrated is desirable, in which the front posts 11 are somewhat longer and the lower side members 14 slope downwardly to conform somewhat to the slope of the beach. Thus, with such proportioning the floor section 29 is substantially horizontal.

It is desirable to provide raised front and side rails for the device, in order to afford a greater degree of security. Thus, the corner members 11 and 12 are extended up above the level of the floor section 29, and their upper ends are connected by the removable front and side rails 38 and 39. These rails can be in the form of sheet metal tubes, having their ends slotted to receive the flanges of the corner members.

Re-baiting while standing upon my device necessitates some form of support for the casting rod. For this purpose I have shown sockets 41 adapted to receive the butt end of a casting rod and mounted near the inner side of the forward corner members 11. These sockets can be suitably secured to one of the members of the device, as for example the member 18 as shown in Fig. 5. When the butt end of a rod is engaged with a socket, the rod may be leaned against the adjacent corner between the front and side rails 38 and 39. Similarly, if desired, suitable supporting means can be provided for facilitating the cutting of bait.

The manner in which my device is used will be apparent from the above description. Assuming that the device is properly assembled, it is carried to the desired point on the beach, and then the lower end portions 37 of the corner members 11 and 12 are forced into the sand. One can then cast with ease while standing upon the device, and may re-bait without retreating up the beach. From time to time, in accordance with the height of the tide, the device can be shifted to any localitiy desired. When collapsed, the device will occupy very little space, and may be carried with the same facility as other fishing paraphernalia.

After the device has been used in one position for some time, the corner members tend to sink until the lower longitudinal members engage the surface of the sand. These members afford a substantial bearing area so that further sinking movement is prevented. Under such conditions there will be no tendency for the device to come apart, because the weight of the floor section 29 is carried by the front and rear lateral members 18 and 21 which in turn tend to force the corner members downwardly with respect to the side sections. Thus the interlock connections with the corner members are at all times retained in tight engagement, to prevent collapsing of the device.

I claim:

1. In a portable and collapsible surf fishing device of the character described, a plurality of structural members detachably retained together to form a raised platform, said members including four upright corner members having depending lower ends forming sand spikes, platform members releasably carried by the corner members, and lower lateral members interlocked with said corner members and presenting substantial bearing areas upon the sand, said interlock being releasable only upon upward movement of the corner members relative to the lateral members.

2. In a portable and collapsible surf fishing device of the character described, a plurality of structural members detachably retained together to form a raised platform, said members including four upright corner members having depending lower ends forming sand spikes, members forming side and end frames adapted to be detachably interlocked with said upright corner members, and platform bars carried by the end frames, the interlock between the side frames and the corner members being releasable only upon upward movement of the corner members relative to the side frames, the interlock between the end frame members and the corner members being releasable only upon upward movement of the end frame members relative to the corner members.

3. In a portable and collapsible surf fishing device of the character described, a plurality of structural members detachably retained together to form a raised platform, said members including four upright corner members, horizontal bars forming a platform floor, members serving to support said bars having substantial interlocking engagement with said corner members, said interlocking engagement being removable upon movement of said last-named members upwardly relative to said corner members, additional members having interlocking engagement with said corner members, and releasable means for retaining all of said members in assembled relationship.

EUGENIO A. AZZARA.